United States Patent
Colon

(10) Patent No.: US 9,061,785 B2
(45) Date of Patent: Jun. 23, 2015

(54) REUSABLE PIZZA CONTAINER AND METHOD FOR MAKING THE SAME

(71) Applicant: Epifanio Colon, New Hyde Park, NY (US)

(72) Inventor: Epifanio Colon, New Hyde Park, NY (US)

(*) Notice: Subject to any disclaimer, the term of this patent is extended or adjusted under 35 U.S.C. 154(b) by 0 days.

(21) Appl. No.: 14/084,883

(22) Filed: Nov. 20, 2013

(65) Prior Publication Data

US 2014/0084046 A1    Mar. 27, 2014

Related U.S. Application Data

(63) Continuation-in-part of application No. 12/927,713, filed on Nov. 23, 2010, now abandoned.

(51) Int. Cl.
| | |
|---|---|
| *B65D 5/355* | (2006.01) |
| *B65D 5/54* | (2006.01) |
| *B31B 1/25* | (2006.01) |
| *B65D 5/66* | (2006.01) |

(52) U.S. Cl.
CPC ............ *B65D 5/0005* (2013.01); *B65D 5/5495* (2013.01); *B31B 1/25* (2013.01); *B65D 5/6664* (2013.01); *B65D 5/5475* (2013.01); *B65D 2301/10* (2013.01); *B65D 2585/366* (2013.01)

(58) Field of Classification Search
CPC ........... B65D 2585/366; B65D 5/0005; B65D 5/5495; B65D 5/5445
USPC .................. 229/101.1, 210, 235, 103, 101.2, 229/120.011; 206/736
See application file for complete search history.

(56) References Cited

U.S. PATENT DOCUMENTS

| | | | |
|---|---|---|---|
| 1,339,334 A | 5/1920 | Heiser | |
| 1,845,436 A | 2/1932 | Wagner | |
| 1,866,230 A | 7/1932 | Stubbs | |
| 2,174,687 A | 10/1939 | Comley | |
| 2,832,466 A | 4/1958 | Sheard | |
| 2,947,637 A | 9/1960 | Fabiano | |
| 3,116,868 A | 1/1964 | Lazure | |
| 3,357,544 A | 12/1967 | Gingher | |
| 3,384,290 A | 5/1968 | Glover | |
| 3,677,458 A * | 7/1972 | Gosling | 229/120.011 |
| 4,008,849 A | 2/1977 | Baber | |
| 4,452,367 A | 6/1984 | Wein | |
| 4,905,837 A | 3/1990 | Schuster et al. | |
| 5,098,013 A | 3/1992 | France | |
| 5,205,473 A | 4/1993 | Coffin | |
| 5,425,497 A | 6/1995 | Sorensen | |
| 5,826,786 A | 10/1998 | Dickert | |
| 6,155,477 A | 12/2000 | Herrera et al. | |
| 6,440,050 B1 | 8/2002 | Capparelli | |
| 6,629,607 B1 | 10/2003 | Gibson | |
| D484,406 S | 12/2003 | Jacquet | |
| 6,863,644 B1 | 3/2005 | Cook | |
| 7,051,919 B1 | 5/2006 | Walsh | |
| 7,261,232 B2 | 8/2007 | Schropp | |
| 7,597,238 B2 | 10/2009 | Money | |

(Continued)

*Primary Examiner* — Christopher Demeree
(74) *Attorney, Agent, or Firm* — Richard B. Klar, Esq.; Law Office Richard B Klar

(57) ABSTRACT

The present invention relates to a container that has a top portion and a bottom portion. The top portion and the bottom portion are adapted to be separated from so that each portion can form its own smaller rectangular shaped container by being reconfigured along its respective plurality of a plurality of perforation lines, fold lines, tear lines and cut lines to hold food products such pizza therein.

19 Claims, 5 Drawing Sheets

(56) References Cited

U.S. PATENT DOCUMENTS

| | | |
|---|---|---|
| D607,321 S | 1/2010 | Mark |
| D623,939 S | 9/2010 | Tearle |
| 2008/0197177 A1* | 8/2008 | Volz et al. ............... 229/101.2 |
| 2011/0138750 A1* | 6/2011 | Walsh ............................ 53/458 |
| 2011/0253772 A1* | 10/2011 | Holch et al. ............. 229/101.2 |

* cited by examiner

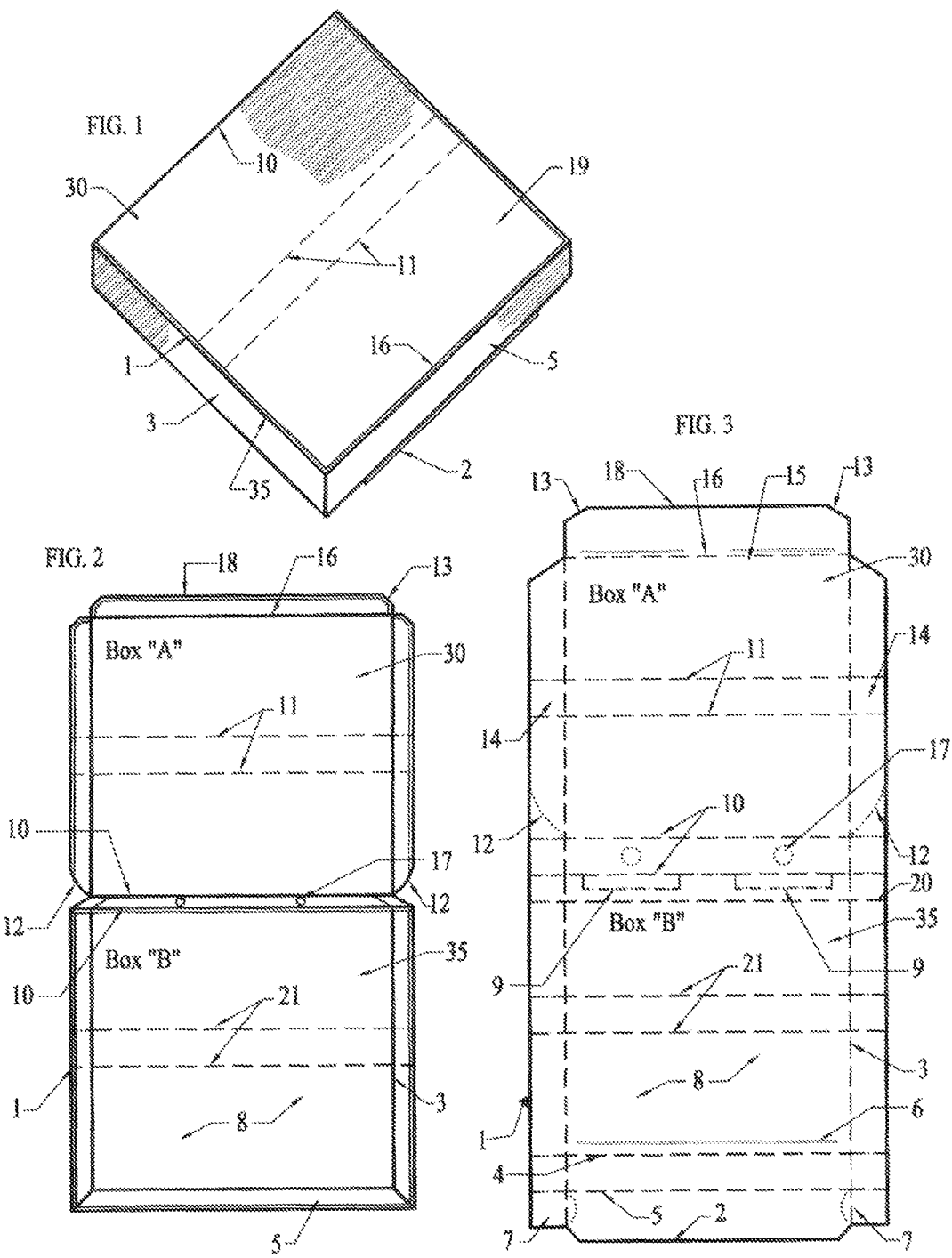

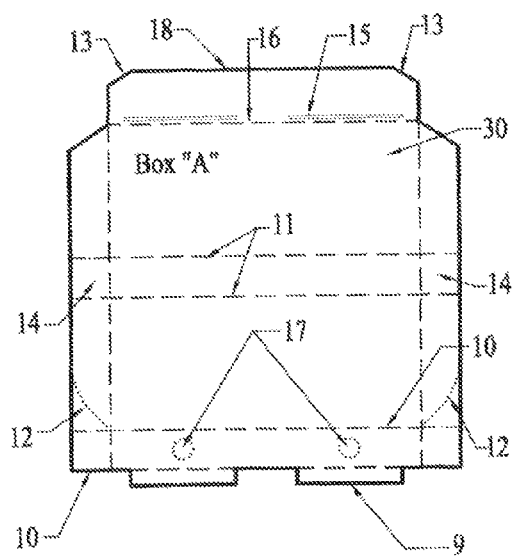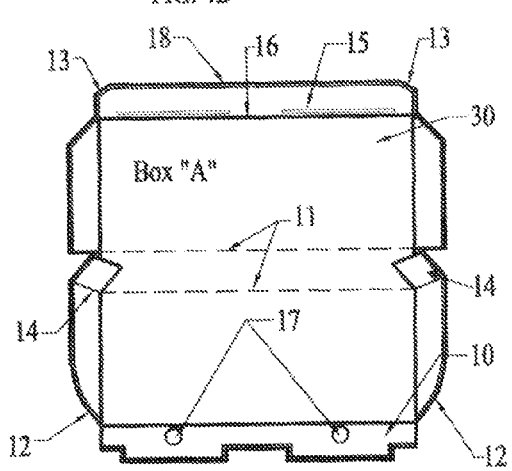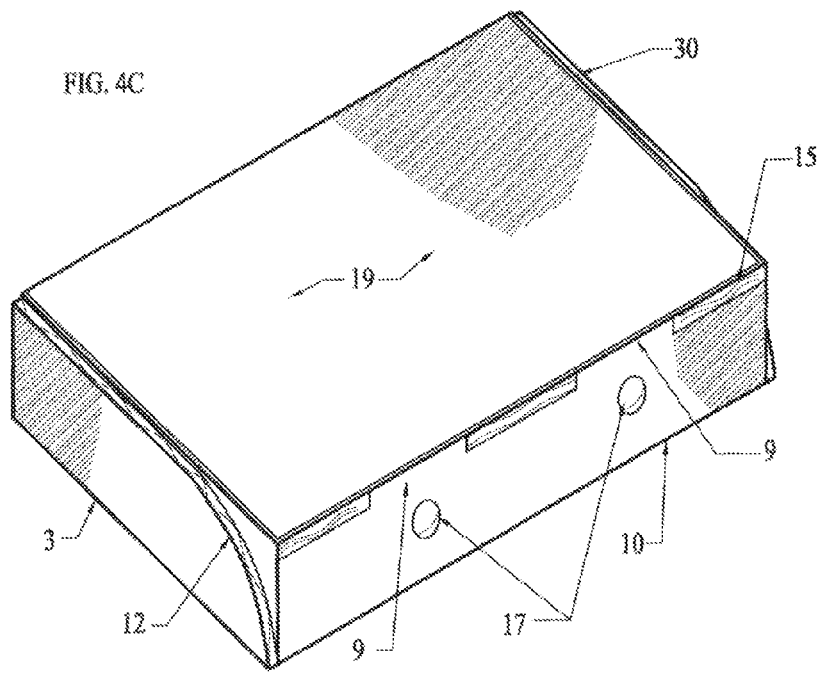

US 9,061,785 B2

REUSABLE PIZZA CONTAINER AND METHOD FOR MAKING THE SAME

RELATED APPLICATIONS

The present application is a continuation in part of U.S. patent application Ser. No. 12/927,713 filed on Nov. 23, 2010 and claims priority thereon under 35 U.S.C. §120.

BACKGROUND

1. Field

The present invention relates to a reusable container for food items such as pizza in which the container can be reshaped and/or reconfigured into one or more containers to hold and to store food items such as but not limited to pizza. In particular the present invention relates to a container for holding items such as pizza which can be reconfigured into two separate reusable containers-one formed from the top portion of the original container and one formed from the bottom portion of the original container. The original container having a plurality of folds, perforations and tears that serve to reconfigure the original containers as two separate reusable rectangular shaped containers reduced in size for storing food items such as but not limited to one to eight slices of pizza in each of the two reusable containers.

2. The Related Art

U.S. Pat. No. 6,440,050 disclosures a container that can be formed into at least two differently shaped and sized boxes; thus efficiently accommodating a whole pizza pie in its original rectangular shape, and efficiently accommodating a slice or other portion of pizza in its reduced-size, triangular shape. The shortcomings of carrying a reduced-sized triangular box is that it odd shaped, it is also uncomfortable to carry and makes for poor storage in refrigerator.

SUMMARY

The present invention relates to a container for holding items such as pizza which can be reconfigured into two separate reusable rectangular shaped containers. The container separates the top portion from the bottom portion and utilizing a plurality of fold lines, perforations and tears to reconfigure the top portion of the original container and the bottom portion of the storing food items such as but not limited to one to eight slices of pizza in each of the two containers. This makes it easier to transport unconsumed portions and much easier to store in a refrigerator in a college dorm or home.

BRIEF DESCRIPTION OF THE SEVERAL DRAWINGS

FIG. 1 is a perspective view of large pizza container of the present design closed;

FIG. 2 is a perspective view of large pizza container according to present design opened;

FIG. 3 is a perspective view of opened container of the present invention;

FIG. 4A-4C are perspective views of opened container Box A displaying the top and reusable portion of the pizza container in which:

FIG. 4A shows the container in an unfolded plan view;

FIG. 4B shows how the fold lines and tabs are folded; and

FIG. 4C shows the reconfigured container formed from the top portion of the original container in FIG. 4A;

FIG. 5A-5C are perspective view of opened container Box B displaying only the reusable portion of the bottom of the original pizza container in which:

FIG. 5A shows the container in an unfolded plan view;

FIG. 5B shows how the fold lines and tabs are folded; and

FIG. 5C shows the reconfigured container formed from the bottom portion of the original container in FIG. 5A;

DETAILED DESCRIPTION OF THE PREFERRED EMBODIMENTS(S)

Figure 5A:
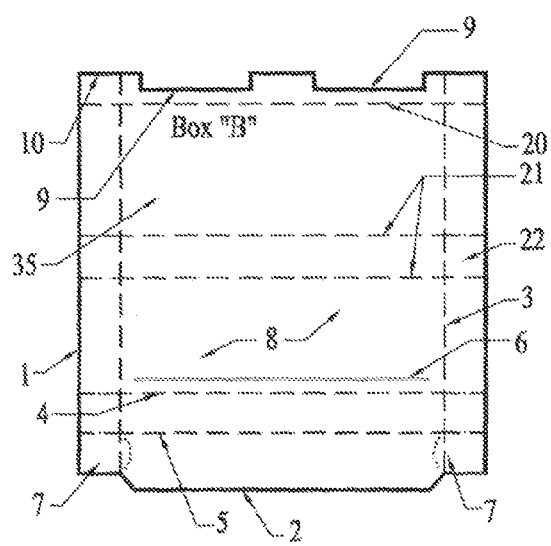

Referring now to drawings of FIGS. 1-13 of the present invention. FIG. 1, shows a pizza container 19. The pizza container 19 has 9 fold lines. This pizza container 19 has three cuts. This pizza container 19 has 5 tears lines. FIG. 1 shows a large closed rectangular shaped pizza container 19 with a plurality of perforations, bends, tears and cuts. The container 19 has a top portion 30 and a bottom portion 35 each adapted to be separated from each other along lines 10 so that each portion can form its own smaller rectangular shaped container to hold food products such pizza therein.

As shown in FIG. 2 the top portion 30 and the bottom portion 35 of container 19 are detachably connected to each other by lines 10. In between lines 10 are two preformed tabs 9 (as seen in FIG. 3) extending from the bottom of the top portion 30 below line 10 which become visible when the top portion 30 and bottom portion 35 are separated from each other as seen in FIGS. 4A and 4B. As shown in FIGS. 4A, 4B and 4C, top portion 30 is transformed into Box A.

Figure 5B:
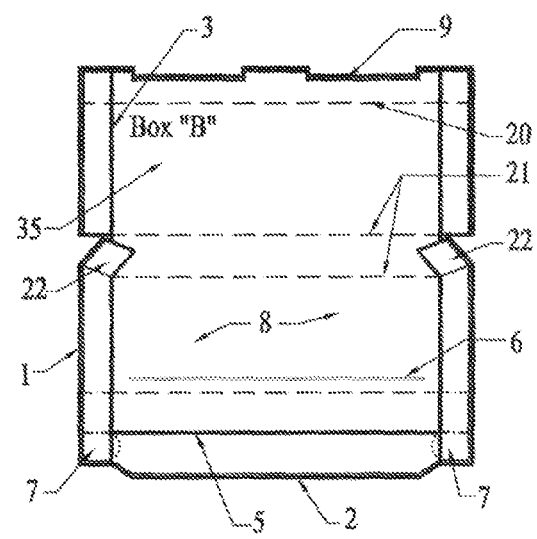
Figure 5C:
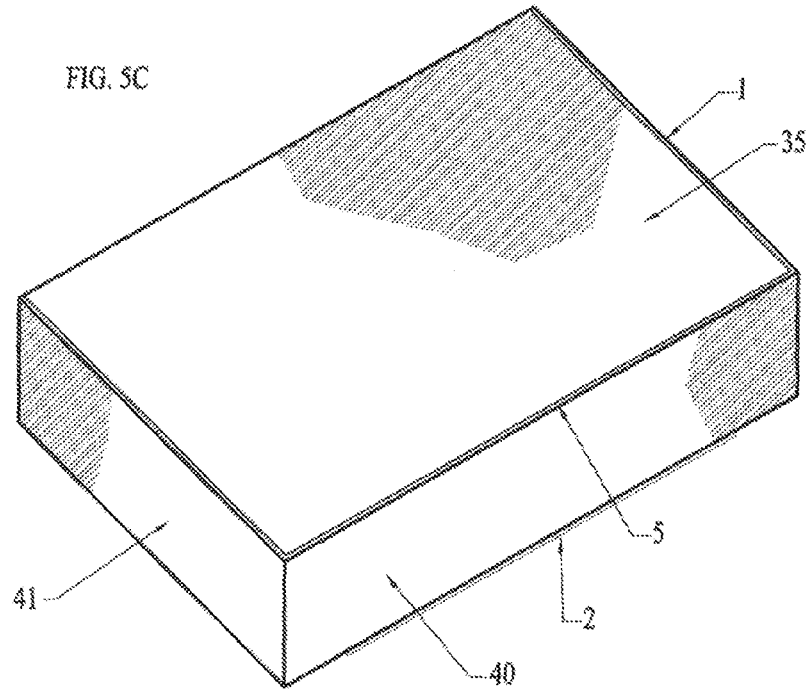

Referring now to FIG. 3, a common rectangular shaped pizza box or container 19 has sides 1, the outer edges of the pizza container 19 that are to be folded inward. Edge 2 forms a bottom portion tongue that will be later inserted into perforation slot 6 to form a front panel 40 for Box B as shown in FIG. 5C. Fold lines 3 will later become the sides of the bottom portion of Box B as shown in FIGS. 5B and 5C. Fold line 4 is the second bend required for sides 2 to fit into perforation slot 6. Fold line 5 is the first bend required for tongue 2 to fit into perforation slot 6. Perforation slot 6 is adapted to receive tongue 2 therein to form front panel 40 of Box B as shown in FIGS. 5A-5C. Tear line 7 is required for tongue 2 to fit into perforation slot 6. Bottom portion 8 is transformed into the bottom portion 8 of the pizza container Box B (see FIGS. 5A-5C) as compared with the top portion of the pizza container Box B between lines 20-21. Tear line 9 will be utilized to remove the upper portion 30 of pizza container 19 and enter that perforated tab 9 into perforation slot 15 (see FIGS. 4A-4C). Fold line 10 differentiates the top portion 30 of pizza container 19. Fold line 11 on the top portion 30 of pizza container 19 uniquely allows the top portion 30 of the pizza container Box A to bend to create a top portion and a bottom portion for Box A. Fold/Tear line 12 is necessitated for creating a lock or locking tab for this pizza container Box A. Piece 13 is the upper edges of the pizza container, Fold/Fear line 14 are locks or locking tabs required for the top portion 30 of this reusable pizza container Box A. Perforation 15 will receive tear line or tab 9. Fold line 16 will squarely bend forward and fit inside of fold line 4. Pieces 17 are cutouts that are circular and are required for this pizza container Box A.

In FIG. 3, fold lines 3 run parallel to each other from the left side and right side and extend from top to bottom and once the folds are completed you can see where the pizza will be placed. Fold line 4 is the second bend required for Piece 2 to fit into perforation 6 and this will create a from lock for the bottom portion of this pizza container. Fold line 5 is the first bend required for tongue 2 to fit into perforation slot 6, which serves as the groove. Piece 8 differentiates the bottom portion 35 of this pizza container 19, which includes tear 7, perforation 6; fold lines 5, 4, 3, Piece 2 and Piece 1 form the top portion of this pizza container.

Tear lines or tabs 9 will be utilized to remove the top portion 30 of this pizza container 19 from Piece 8, the bottom portion 35 and enter that perforated tab into perforation 15 when converting common size pizza container to a reusable pizza container, Box A. Fold line 10 differentiates the top portion of this pizza container and it includes fold lines 11, and 16, tear lines 12 and 14, Piece 13, perforation 15 and cutouts 17. Fold line 11 on the top portion of this pizza container uniquely allows the top portion of this pizza container, once removed from the bottom portion of this pizza container, to bend and thus creating a reusable pizza container, whereupon leftover pizza from three pieces up to eight can be stored. Tear/Fold line 12 is necessitated for creating a lock for this pizza container.

Piece 13 is the upper edges of pizza container and they will tuck into fold lines 10. Tear/Fold line 14 are locks or locking tabs required for the top portion of this reusable pizza container, Perforation 15 will be moved forward to receive tear line 9. Fold line 16 will squarely bend forward and inside of fold line 4. Pieces 17 are circular cut outs, known as in trade industry as vent holes, are required for this pizza container.

FIG. 3 is typically and preferably dimensioned as an 18 inch×18 inch×2 inch pizza container, which holds the standard hand-tossed pizza pie. Tongue 2 which is connected to the bottom portion of this pizza container 19 will be utilized to be inserted into perforation slot 6. In this configuration preferably two perforations slots will accept two tabs or tongues. Providing a long perforation and tab/tongue system in the present invention permits air to circulate from the rear of this pizza container to the front and vice verse. Fold lines 3 preferably run parallel or substantially parallel to each other from the left side and right side and extends from top to bottom and once the folds are completed that is where the pizza will be placed. Aforementioned lines also intersect tear lines 7, 12 and 14. Fold lines 4 and 5 are required for tongue 2 to fit into perforation slot 6 (see FIG. 5B) and tear line 7 this will create a front lock that is a structurally sound pizza container and will be capable of holding a large and very hot pizza. Piece 8 differentiates the bottom portion of this pizza container, whereupon a pizza will be placed and it includes Tear 7, perforation 6, fold lines 5, 4, 3, tongue 2 and sides 1 from the top portion of this pizza container.

FIGS. 4A, 4B and 4C, together show views of opened container Box A displaying the reusable portion of the pizza container 19 container displaying the reusable portion of the pizza container; Tear line 9 in bodies, fold lines 10, 11, 12, 14, and 16, Piece 13 (an angle cut tab), perforation 15 and cutouts 17, in this reusable pizza container. Once tear line 9 is removed from the bottom portion, now the upper portion of this pizza container, transforms into a reusable pizza box container, Box A. Fold line 10 is now part of the reusable pizza container, which was separated from pieces 1, 2 and 8 fold lines 3, 4, 5, perforation 6, and tear line 7 and it serves as part of the front of FIG. 5, Box B. Tear/Fold line 12 is needed for creating a lock for the large pizza container, in that the tear is first made and then the fold follows thereafter. As the top of this pizza container meets the bottom portion it will be sandwiched by Piece 1 and fold line 3. Piece 13 is the upper edges of pizza container and they will tuck into fold lines 10. Tear/Fold line 14 is required for creating a lock or locking tab for this reusable pizza container, in that, the tear is made first then the fold follows thereafter. As the top of this reusable pizza container, which encompasses Pieces 1 and 13, fold lines 3, 11, 16, perforation 16 meets the bottom portion, which utilizes Piece 1, fold lines 3, 9, and 10, Tear/fold 12, Tear line 9 and cutouts 17, will be sandwiched by Piece 1 and fold line 3. Perforation 15 will be moved forward to receive tear line 9 and creating a lock mechanism for this reusable pizza container. Fold line 16 will squarely bend forward and fit inside of fold line 4. Piece 17 are circular cut outs, identified in the industry as vent holes, and are required for this pizza container.

The reusable pizza container construction is preferably made of E-fluted corrugated fiberboard. A product made for strength and desirable for art work. Piece 1 is 41 inches in length (on both sides) with a 30 degree angle cut which ends at 41¾ inches long. Piece 2 is a ¼ inch tab, measures 14 inches in length, of this pizza container which will later be inserted into perforation 6. Fold lines 3 is 43¾ inches in length (on both sides) once the folds are completed that is where the pizza will be placed. Fold line 4 is 3²⁹⁄₃₂ inches from Piece 2 and Fold line 5 is 2¼ inches from Piece 2. Fold Piece 2 to fold line 5, then tear line 7, which measures 3²⁹⁄₃₂ toward perforation 6, place Piece 2 over Tear line 7 and push them into perforation 6 which is ⅛ inch from fold line 4 and is 14 inches in length, thus, creating a very secure lock for this pizza container. Piece 8 is the surface area measuring 18 inches×18 inches, whereupon the pizza will rest. FIGS. 4A, 4B and 4C is a reusable pizza container, Box A. The dimensions of this reusable pizza container will preferably be 8 inches×18 inches by 2 inches. FIGS. 5A, 5B and 5C together show views of container, Box B displaying another reusable portion of the pizza container; Tear line 9 starts at Piece 1, which is 1¹⁰⁄₁₂ inches from fold line 3, continues 1 inch past fold lines 3, there is perpendicular tear for ½ inch, a horizontal tear for 5¾ inches, a perpendicular tear for ½ inch, a 4¾ inch horizontal tear, a ½ inch perpendicular tear, a 5¾ inch horizontal tear, ½ perpendicular tear, a 1 inch tear past fold line 3 and continuance to Piece 1. Separation from large pizza container to reduced size-reusable pizza container has been completed.

Figure 6:
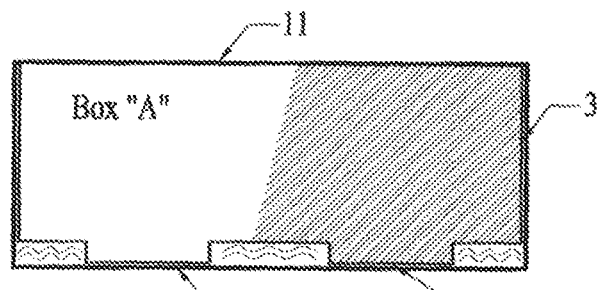
FIG. 6 is a perspective top view of reduced pizza container and partially closed.

Fold lines 10 are preferably 1¹⁰⁄₁₂ inches, apart from each other, and from Tear line 9, more specifically from the Tear line 9 where preferably the measurement is 4¾ inches and spans 22 inches across to Piece 1. Fold line 11 is preferably 8 inches from fold line 10 and starts at Piece 1, intersects fold line 3 at preferably 1¹⁰⁄₁₂ inches and goes 22 inches from left side to right side, creating a very unique bend in this reusable pizza container. Piece 13 is the upper edges of pizza container, cut at 30° measuring preferably ¾ inch will move forward to fold line 10. Tear/Fold line 14, measuring preferably 1¹⁰⁄₁₂ inch by 1¹⁰⁄₁₂ inch is required for creating a lock for this reusable pizza container, in that, the tear is made first then the fold follows thereafter. As Piece 18, this preferably measures 18 inches of this reusable pizza container, which encompasses Pieces 1 and 13, fold lines 3, 11, 16, perforation 16 meets fold line 10 (the bottom portion), which utilizes Piece fold lines 3, 9, and 10, Tear/fold 12, Tear line 9 and cutouts 17, will be sandwiched by sides 1 and fold line 3 and will create a lock or locking tabs for this very functional and reusable pizza container. Perforations 15 preferably measures 5¾ inches apiece, will bend forward toward fold line 10. Tear line 9 will be moved upward to enter perforation 15. Pieces 17 are vent holes for this reusable pizza container preferably measures 22/32 inch in diameter, and will be located 6 inches from fold line 3 on the left side and right side and ½ inch from fold line 10 and fold line 9. The dimensions of this reusable pizza container will preferably be 8 inches×18 inches by 2 inches, as shown in FIG. 6.

FIGS. 5A, 5B and 5C is another reusable pizza container, Box B. The dimensions of this container are preferably 7 inches×18 inches by 2 inches. As examples of further, useful benefits of the present invention, will be made of E fluted corrugated fiberboard, which is environmentally friendly. The present invention is economical. In addition, in its reconfigured dimensions, makes it easy to transport and store in a refrigerator at home or college dormitory.

Figure 7:
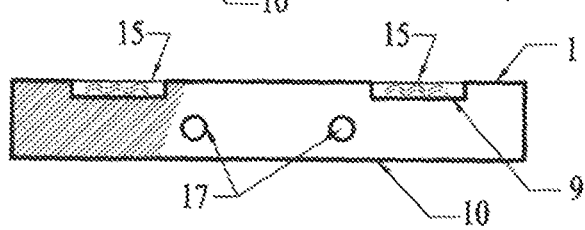
FIG. 7 is a perspective front view of reduced pizza container and closed.
Figure 8:
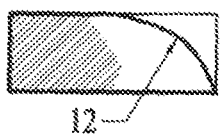
FIG. 8 is a perspective right side of reduced pizza container.
Figure 9:
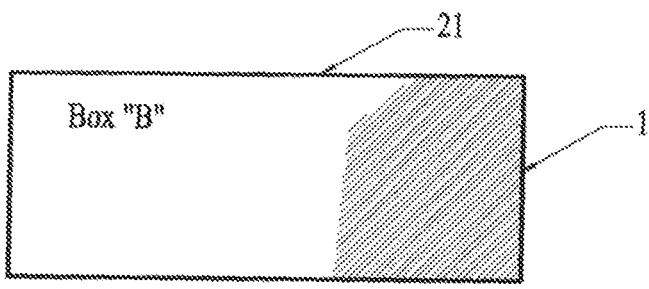
FIG. 9 is a perspective top view of reduced pizza container.

FIG. 7 illustrates how a sheet of material may be cut and folded according to the present invention to form the front panel of Box A. FIG. 6, illustrates the top view of Box A of the present invention. FIG. 8 illustrates a perspective right side of reduced pizza container Box A showing fold line 12. FIG. 9 illustrates the bottom view of Box A of the present invention.

Figure 10:
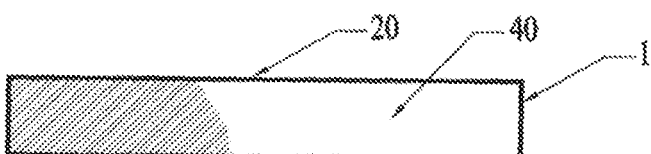
FIG. 10 is a perspective front view of reduced pizza container.

FIG. 10 illustrates the front view of Box B of the present invention. Piece 3 preferably measures 1 10/12 inches length. Piece 20 which are the outer layer of this reusable pizza container preferably measuring 18 inches. The dimensions of this reusable pizza container will be preferably 7 inches×18 inches by 2 inches.

Figure 11:
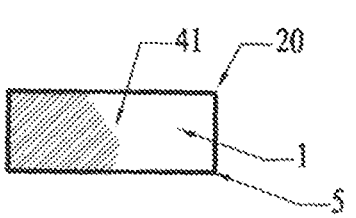
FIG. 11 is perspective right view of reduced pizza container.
Figure 12:
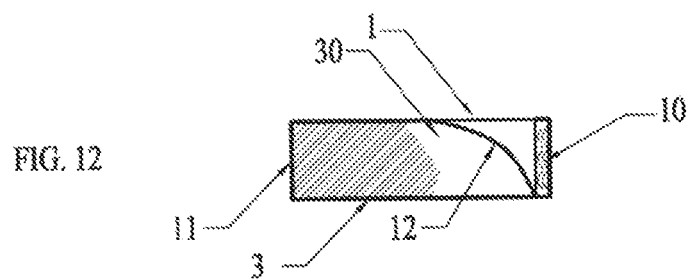
FIG. 12 is right side view of reduced closed pizza container.
Figure 13:
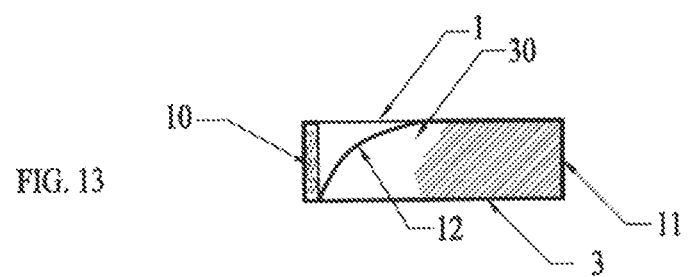
FIG. 13 is the left side view of reduced closed pizza container.

FIG. 11 illustrates the right side view of Box B of the present invention. FIG. 12 illustrates the right side front view of the present invention. FIG. 13 is a plan view of the present invention and illustrates the left side view of the present invention.

Although only one embodiment of commonly known pizza box is shown, it should be noted that the present invention may be incorporated within any rectangular shaped pizza container without departing from the scope to the invention.

As examples of further, useful benefits of the present invention will preferably be made of E fluted corrugated fiberboard, which is environmentally friendly. The circular vents and locking mechanism allow air to flow therein preventing its content to become soggy and undesirable. The present invention is economical. In addition, in its reconfigured dimensions of 8 inches×18 inches by 2 inches make it s easy to transport and store in a refrigerator at home or college dormitory. In addition Box A and Box B are smaller is size than container 19 and each can hold, in its reduced size, up to 8 slices of pizza by placing a bottom row of four slices and a top row of four slices on top of the bottom row with wax paper in between. In this way the reduced containers of Boxes A and B are easier to carry and store pizza slices or other food products including but not limited to cake, pie, etc.

While the foregoing written description of the invention enables one of ordinary skill to make and use what is considered presently to be the best's mode thereof, those of ordinary skill will understand and appreciate the existence of variations, combinations, and equivalents of the specific embodiment, method, and examples herein. The invention should therefore not be limited by the above described embodiment, method and examples, but by all embodiments and methods within the scope and the spirit of the invention.

What is claimed:

1. A rectangular shaped container for food products such as pizza, comprising a top portion and a bottom portion, said top portion and said bottom portion being detachably connected to each other, each of said top portion and said bottom portion having a plurality of a plurality of perforation lines, fold lines, tear lines and cut lines so that said top portion and said bottom portion are reconfigured along their respective plurality of perforation lines, fold lines, tear lines and cut lines and a base with a lateral containment element and an upper closure lid, comprising: at said base or at said closure lid, at least one weakened portion which defines at least a sheet-like element forming a single separation line which can be detached to form separate smaller reusable rectangular containers that are smaller in size than that of said rectangular shaped container forming two secondary reusable boxes, wherein said two secondary reusable boxes are of different sizes having completed side walls on four sides of each of said secondary reusable boxes to hold food products such as pizza therein.

2. A pizza box according to claim 1 further comprising a base with a lateral containment element and an upper closure lid, comprising: at said base or at said closure lid, at least one weakened portion which defines at least a sheet-like element which can be detached to provide two secondary boxes for pizza.

3. A pizza box according to claim 2, wherein said weakened portion has a closed shape.

4. A pizza box according to claim 2, wherein the pizza box comprises at one weakened portion at a defined hinged attached back wall of said base and/or of said closure lid and are adapted to define a sheet-like element which can be detached to provide 2 secondary boxes.

5. A pizza box according to claim 2, wherein a portion of said at least one weakened portion is arranged along an extension of a connecting edge between said lateral containment element and said upper closure lid.

6. The pizza box according to claim 2, wherein said weakened portion is provided by die cutting.

7. The pizza box according to claim 6, wherein said at least one perforation is designed, following separation of said first box from said second box, to remain connected to said base or to said closure lid.

8. The pizza box according to claim 2, said weakened portion has at least one perforation which is adapted to facilitate the separation of a first reduced sized separate box from a second reduced sized separate box.

9. The pizza box according to claim 2, wherein the pizza box it comprises, at said sheet-like element, at least one folding line which is adapted to facilitate the folding of said sheet-like element.

10. The pizza box according to claim 2, wherein the pizza box comprises at least one folding line at portions of said base and/or of said upper closure lid.

11. The pizza box according to claim 2, wherein said sheet-like element comprises at a partially curvilinear edge.

12. The pizza box according to claim 2, wherein said pizza box is made of cardboard for food use.

13. The pizza box according to claim 1 wherein said two reusable secondary boxes each have vent holes.

14. The pizza box according to claim 1 wherein said container has a fold or tear line that forms a lock for one of the secondary pizza boxes.

15. The pizza box according to claim 1 wherein said two secondary reusable boxes Can be top loaded with food products such as pizza.

16. The pizza box according to claim 1 wherein said first reusable box is formed from said top portion of said container and said second reusable box is formed from said bottom portion of said container.

17. A method for reconfiguring a rectangular shaped container for food products such as pizza into two separate containers or boxes, the steps comprising
providing a rectangular shaped container for food products such as pizza having a top portion and a bottom portion,
detachably connecting said top portion and said bottom portion to each other, providing each of said top portion and said bottom portion with a plurality of perforation lines, fold lines, tear lines and cut lines so as to reconfigure said top portion and said bottom portion along their respective plurality of perforation lines, fold lines, tear lines and cut lines and a base with a lateral containment element and an upper closure lid, comprising: at said base or at said closure lid, at least one weakened portion which defines at least a sheet-like element forming a single separation line which can be detached to form separate smaller reusable rectangular containers that are smaller in size than that of said rectangular shaped container forming two secondary reusable boxes, a first box being formed from said top portion of said container and a second box being formed from said bottom portion of said container wherein each formed secondary reusable box has completed side walls on all four sides of each of said secondary boxes to hold food products such as pizza therein.

18. The method according to claim 17 wherein said two reusable secondary boxes each have vent holes.

19. The method according to claim 17 further comprising the step of providing a fold or tear line in said container to form a lock for one of the secondary pizza boxes.

* * * * *